United States Patent
Ericson

(10) Patent No.: US 10,861,005 B2
(45) Date of Patent: Dec. 8, 2020

(54) SYSTEMS AND METHODS FOR FACILITATING TRANSACTIONS IN A VIRTUAL REALITY ENVIRONMENT

(71) Applicant: PAYPAL, INC., San Jose, CA (US)

(72) Inventor: Braden Ericson, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 409 days.

(21) Appl. No.: 15/839,762

(22) Filed: Dec. 12, 2017

(65) Prior Publication Data
US 2019/0180270 A1 Jun. 13, 2019

(51) Int. Cl.
*G06Q 20/12* (2012.01)
*G06Q 20/32* (2012.01)
*G06Q 20/34* (2012.01)
*G06Q 20/40* (2012.01)

(52) U.S. Cl.
CPC .......... *G06Q 20/351* (2013.01); *G06Q 20/32* (2013.01); *G06Q 20/409* (2013.01); *G06Q 20/4014* (2013.01)

(58) Field of Classification Search
CPC .. G06Q 20/40145; G06Q 20/00; G06Q 20/32; G06Q 20/36; G06Q 20/354; G06Q 20/12
See application file for complete search history.

(56) References Cited

U.S. PATENT DOCUMENTS

| | | | |
|---|---|---|---|
| 2013/0103560 A1* | 4/2013 | Stone | G06Q 40/02 705/35 |
| 2014/0164091 A1* | 6/2014 | Hunt | G06Q 30/0222 705/14.32 |
| 2015/0262291 A1* | 9/2015 | West | G06Q 40/025 705/14.66 |
| 2018/0204196 A1* | 7/2018 | Licht | G06Q 20/12 |

* cited by examiner

*Primary Examiner* — Hao Fu
(74) *Attorney, Agent, or Firm* — Haynes and Boone, LLP

(57) ABSTRACT

Methods and systems for facilitating a payment transaction for a user in a virtual reality (VR) environment are described herein. Based on detecting a first interaction of the user with a physical payment card in the physical environment, a virtual payment card corresponding to the physical payment card is generated in the VR environment. The virtual payment card may have a different serial number than the physical payment card. In response to detecting a second interaction of the user with the physical payment card in the physical environment, a transaction using the virtual payment card in the VR environment is processed.

20 Claims, 11 Drawing Sheets

SYSTEMS AND METHODS FOR FACILITATING TRANSACTIONS IN A VIRTUAL REALITY ENVIRONMENT

BACKGROUND

The present specification generally relates to facilitating transactions in a virtual reality environment, and more specifically to facilitating transactions in the virtual reality environment based on user interaction with physical objects.

RELATED ART

Virtual reality (VR) is a computer-generated environment that simulates the real world environment. By entering into a VR environment, users may enjoy different experiences without leaving the comfort of their own homes. With the advancements in computer processing power and graphics, the VR experience has become increasingly sophisticated. Today's VR applications may include generating an entire simulated city where users may interact with each other or creating a virtual battleground in which a full-fledged world war may take place. As the VR environments become more interesting and sophisticated, users now desire to perform more activities within the VR environment. For example, users may desire to perform various types of transactions (e.g., make a purchase, send money to someone, send a picture from a physical phone to someone, etc.) with other users in the VR world. However, most of today's VR environments are self-contained, and only transactions that involve objects within the VR environments can be performed. For example, a user in a VR application must earn money in a virtual currency acceptable within the VR environment in order to make a purchase in the VR environment. Thus, there is a need for systems and methods that facilitate transactions in a VR environment using physical objects in the real world environment and improve security measures for these transactions.

Figure 1:
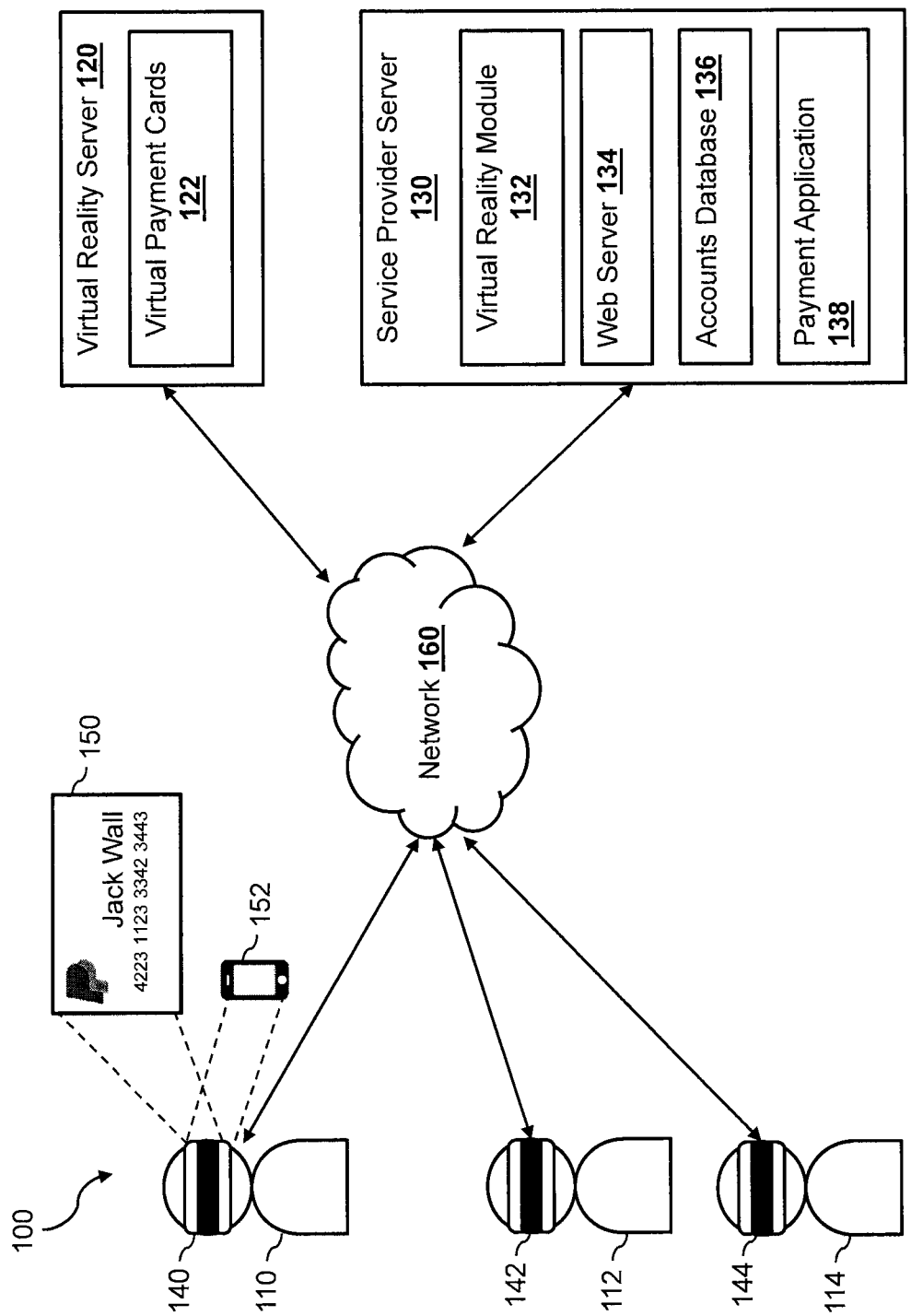
FIG. 1 is a block diagram illustrating a virtual reality system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating a transaction for a user in a virtual reality (VR) environment based on a detected interaction by the user with a physical object in a physical environment. A VR environment is a computer-generated environment that simulates the physical world. The VR environment may include many virtual objects corresponding to physical objects that one can find in the real world, such as virtual houses, virtual stores, virtual consumable items, etc. In some embodiments, based on detected interactions of a user with a physical object in the physical environment, transactions based on the physical object may be performed in the VR environment.

When an initial interaction of a user with a physical object is detected in the physical environment, a virtual object corresponding to the physical object is generated in the VR environment. For example, an image capturing device (e.g., a camera) may be used to monitor behavior of the user in the physical world while the user is also interacting with the VR environment. When an interaction, which can be predefined, between the user and the physical object is detected, a virtual object corresponding to the physical object is generated within the virtual environment. In some embodiments, the virtual object in the VR environment is tied to the physical object in the physical environment such that the virtual object exhibits attributes of the corresponding physical object. Furthermore, modifications to the physical object and/or subsequent interactions of the user with the physical object may affect a configuration of the virtual object in the VR environment. The virtual object may then be used in the VR environment, for example, interacting with other virtual objects in the VR environment and facilitating transactions in the VR environment.

In one example, the physical object is a physical payment card, such as a credit card, a debit card, a gift card, etc. In this example, in response to detecting a first interaction by the user with the physical payment card (e.g., taking the physical payment card out from a pocket, purse, or wallet), one or more images of the physical payment card are obtained. Information related to a payment account of the user may be extracted from the one or more images of the physical payment card. For example, an issuing entity, a serial number, an expiration date, a security code, and a name of the account holder of the physical card may be extracted from the one or more images. A virtual payment card may then be generated in the VR environment based on the extracted information. A graphical representation may also be created to represent the virtual payment card in the VR environment. In some embodiments, for security purposes, information that may identify the corresponding physical payment card may be obfuscated from the representation of the virtual payment card. Furthermore, the representation of the virtual payment card may be viewable by only a set of users in the VR environment that are authorized by the user. Once the virtual payment card is generated, the user may use the virtual payment card to make payment transactions in the VR environment using a payment account associated with the physical payment card.

In some embodiments, the user may make a payment transaction in the VR environment by performing a second interaction with the physical payment card in the physical environment (e.g., performing a vertical card swiping gesture). When the second interaction of the user with the physical payment card is detected, based on a context of the user in the VR environment, a payment transaction may be processed using the payment account. For example, if it is determined that the user is at a cashier of a virtual store in the VR environment, the payment transaction may be processed for making a payment to the virtual store. On the other hand, if it is determined that the user is interacting with a friend in the VR environment, the payment transaction may be processed for making a payment to a payment account of the friend.

In some embodiments, the virtual payment card may be passed along to other users in the VR environment. For example, the user may decide to let her daughter use the virtual payment card in the VR environment. Thus, the user may pass the virtual payment card to her daughter in the VR environment. Once in possession of the virtual payment card, the daughter may perform payment transactions in the VR environment using the payment account of the user.

Different embodiments may implement different security measures to avoid fraud or unauthorized transactions using the virtual payment card of the user in the VR environment. In some embodiments, when a request to perform a payment transaction using the virtual payment card is received or identified, the user (the owner of the virtual payment card) is notified. Furthermore, the user may be asked to confirm before the payment transaction is processed. In some embodiments, a third interaction of the user with the physical card may be detected before the payment transaction is processed to ensure that the user still has possession of the physical card.

In some embodiments, when it is determined that the user performs a fourth interaction with the physical card associated with a recall of the card, the virtual payment card is recalled and automatically relocated back to the user in the VR environment. As such, the owner of the virtual payment card may exert control over the virtual payment card independent of the location of the virtual payment card in the VR environment.

In another example, the physical object is a computing device such as a smart phone, a laptop, a tablet, etc. In this example, in response to detecting a first interaction by the user with the physical computing device in the physical environment (e.g., taking the physical computing device from a pocket, purse, or bag), a communication channel may be established with the physical computing device. For example, a short-range wireless communication channel (e.g., Bluetooth®, WiFi, etc.) may be established with the physical computing device to retrieve information stored on the physical computing device. In some embodiments, at least a portion of the data stored on the physical computing device is retrieved. A virtual computing device may then be generated in the VR environment based on the retrieved data. The user may then use the virtual computing device to perform various types of data transactions (e.g., sharing data, presenting data, etc.) within the VR environment.

Similar to the virtual payment card, the virtual computing device may be passed to other users in the VR environment. As such, different security measures may also be implemented to safeguard the data associated with the virtual computing device. For example, a transaction using data associated with the virtual computing device may be processed only when an interaction of the user with the physical computing device is detected. Furthermore, similar to the physical payment card, the user may perform a "recall" interaction with the physical computing device to recall the virtual computing device in the VR environment.

FIG. 1 illustrates a VR system 100 according to one embodiment of the disclosure. The VR system 100 includes a service provider server 130 that is communicatively coupled with a virtual reality (VR) server 120 and VR user devices 140, 142, and 144 via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The VR server 120 may be implemented as one or more computer servers configured to generate and provide a VR environment to various users, such as users 110, 112, and 114, over the network 160. The VR environment may include different virtual objects, such as virtual consumable items, virtual merchandise, virtual stores, virtual banks, and other virtual objects that simulate corresponding physical objects (including locations) in the physical environment. Each of the users 110, 112, and 114 may use a VR user device to interact with the virtual objects in the VR environment.

Figure 2:
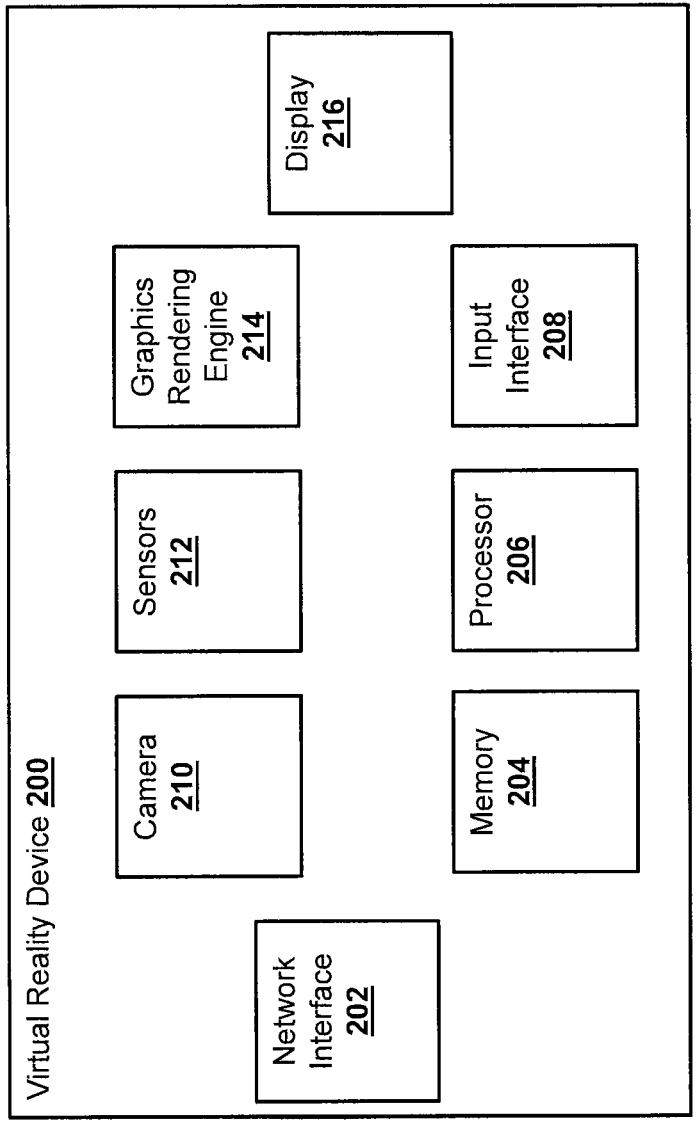
FIG. 2 is a block diagram illustrating a virtual reality user device according to an embodiment of the present disclosure.

The VR user devices 140, 142, and 144 may come in different forms. In some embodiments, each the VR user devices 140, 142, and 144 may include a goggle, such as an Oculus Rift®, a Sony® PlayStation® VR, a Google® Daydream View®, which the user may wear. FIG. 2 illustrates an example VR user device 200 accordingly an embodiment of the disclosure. The VR user device 200 may be implemented in each of the VR user devices 140, 142, and 144. The VR user device 200 may include a network interface 202 configured to communicate data with the VR server 120 and the service provider server 130 via the network 160. The VR user device 200 may also include a camera 210 for capturing images of the physical environment. For example, the VR user device 200 may use the camera 210 to monitor a behavior of a user of the device, and detect when the user performs an interaction with a physical object in the physical environment. The VR user device 200 may also include one or more sensors to detect a location, an orientation, a motion, a temperature, a humidity, and/or other aspects of the VR user device 200. In some embodiments, the VR user device 200 may use the graphics rendering engine 214 to render different views of the VR environment on a display 216.

The VR user device 200 may also include an input interface 208. The input interface 208 may include one or more of a keyboard, a touch-based input device, a motion-based input device, etc. for receiving instructions from the user. The VR user device 200 may include one or more processors 206 and memory 204 (e.g., RAM) for storing software instructions, which when executed by the one or more processors 206 perform operations for the VR user device 200 as described herein. Each of the one or more processors 206 may be a micro-controller, digital signal processor (DSP), or other processing component.

For example, the processors 206 may use the sensors 212 to detect a location, an orientation, and/or a motion of the VR user device 200 and present a corresponding view of the VR environment on the display 216 based on the detected location, orientation, and/or motion. Furthermore, the processors 206 may use the camera to continuously or periodically monitor behavior of the corresponding user in the physical environment as the user is interacting in the VR environment. When an interaction, which maybe predefined, of the user with a physical object in the physical environment is detected, the VR user device 200 may use the network interface 202 to transmit a signal to the VR server 120 via the network 160 indicating that the user has performed the interaction. The VR server 120 and/or the service provider server 130 may then generate a virtual object or perform a transaction using the user-generated virtual object in the VR environment based on the detected interaction.

The service provider server 130, according to some embodiments, may be maintained by an online service provider, such as PayPal, Inc. of San Jose, Calif., which may provide services related to detection of online phishing campaigns. The service provider server 130 may also be configured to process online financial and information transactions on behalf of users. In some embodiments, the service provider server 130 may also be configured to provide access to goods and services (collectively referred to as "items") of a merchant or service provider that are for purchase and may provide a payment service processing for the purchased items.

According to various embodiments of the disclosure, the service provider server 130 may include a VR module 132 configured to facilitate transactions in the VR environment as described herein. The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130 may also include an accounts database 136 that stores information related to user accounts that were registered with an entity through the service provider server 130. The information of a user account stored in the accounts database 136 may include an account identifier, a user name, a password (or other types of authentication credentials such as fingerprint information), contact information, other personal information of the user, transaction history related to the user account, available funds of the user account, and other user account related information. In some embodiments, the payment application 138 may process transactions, such as payment transactions, with a user account based on the account information associated with the user account stored in the accounts database 136. The service provider server 130 may include other applications and may also be in communication with one or more external databases (not shown), that may provide additional information to be used by the service provider server 130. In some embodiments, the one or more external databases may be databases maintained by third parties, and may include third party account information of users who have user accounts with the service provider server 130.

Figure 3:
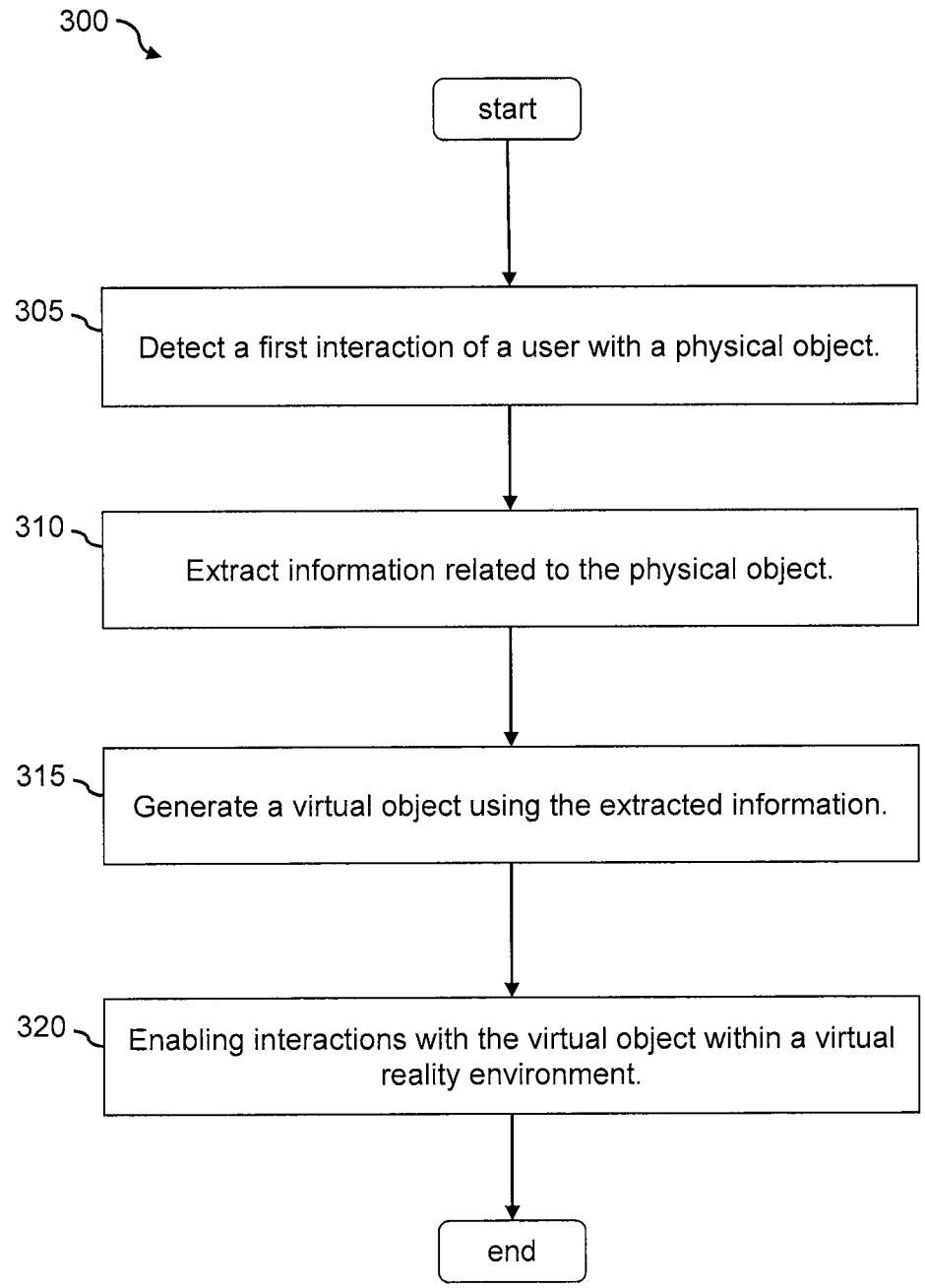
FIG. 3 is a flowchart showing a process of generating a virtual object based on a detected interaction of a user with a physical object according to an embodiment of the present disclosure.

FIG. 3 illustrates a process 300 for generating a virtual object in a VR environment based on an interaction of a user with a physical object in a physical environment according to various embodiments of the disclosure. In some embodiments, the process 300 may be performed by the VR system 100. A user (e.g., the user 110) may register an account with the VR server 120. By registering an account, the user 110 may then interact with a VR environment generated by the VR server 120 using the VR user device 140. In some embodiments, the VR environment may be a multi-dimensional computer-generated space that simulates a real world environment. The VR environment may include different virtual objects, such as virtual stores, virtual buildings, virtual merchants, virtual transportation vehicles, other users, etc., with which the user 110 may interact using the VR user device 140. Furthermore, after the user 110 registers with the VR server 120, the VR server 120 may generate a virtual person that corresponds to the user 110 and may generate a graphical representation for the virtual person, such that other users may view and interact with the user 110 in the VR environment. The virtual person may have a unique identifier that identifies the virtual person, and attributes associated with the virtual person. Such attributes may include a gender, an age, the graphical representation generated for the virtual person, and a set of virtual objects that are in possession of the virtual user. These attributes may be used when the user 110 interacts with other virtual objects and/or virtual persons in the VR environment via the corresponding virtual person.

The user 110 may also register a user account with the service provider server 130. The user account may include a unique identifier that identifies the user account and other attributes, such as information of the user 110 (e.g., a name, a gender, an age, a birthday, etc.), information related to one or more funding sources that are linked to the user account, payment transaction history of the user 110 using the one or more funding sources, and other information related to the user 110. Furthermore, after registering with the service provider server 130, the service provider server 130 may generate a user profile for the user 110. In various implementations, the user profile may be created using data and information obtained from cell phone activity of a mobile device associated with the user 110 over the network 160. Cell phone activity transactions may be used by the service provider server 180 to create at least one user profile for the user 110 based on activity from the user 110's mobile device (e.g., cell phone). The user profile may be updated with each financial and/or information transaction (e.g., payment transaction, purchase transaction, etc.) achieved through use of the mobile device of the user 110. In various aspects, this may include the type of transaction and/or the location information from the mobile device of the user 110. As such, the profile may be used for recognizing patterns of potential fraud, setting transaction limits on the user, etc. In some embodiments, the attributes, the user profile, and other information of the user account may be stored by the service provider server 130 in the accounts database 136.

In some embodiments, the user 110 may communicate information of the user account with the service provider server 130 to the VR server 120, and information of the account with the VR server 120 to the service provider server 130 so that the VR server 120 and the service provider server 130 may link the account with the VR server 120 and the user account with the service provider server 130 together.

Figure 4:
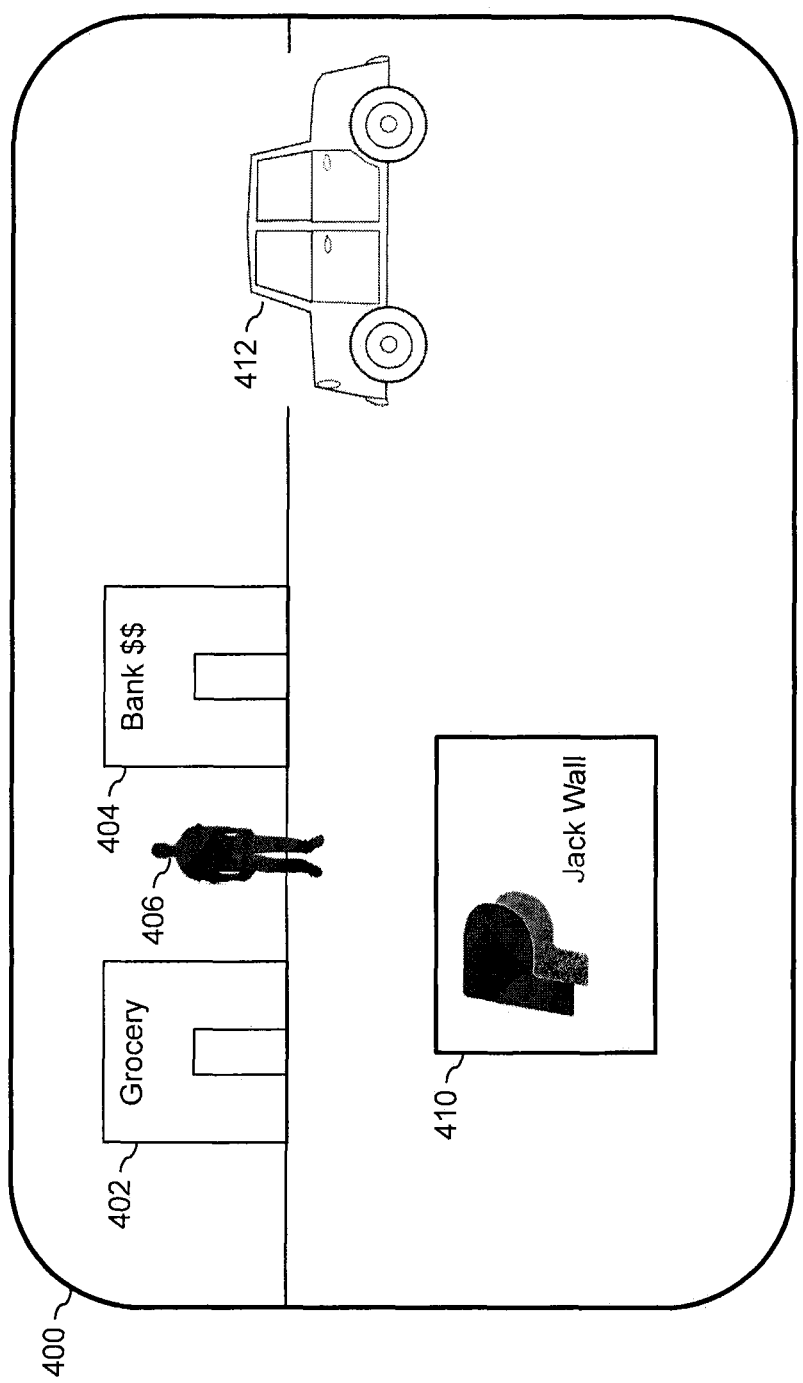
FIG. 4 illustrates an example view of a virtual reality environment according to an embodiment of the present disclosure.

As discussed above, after registering with the VR server 120, the user 110 may begin exploring and interacting within the VR environment using the VR user device 140. FIG. 4 illustrates a view 400 of the VR environment presented in the VR user device 140 for the user 110. As shown, the VR environment includes a virtual grocery store 402, a virtual bank 404, a virtual person 406, and a virtual car 412. The virtual person 406 may be a graphical representation of a user (e.g., the user 112) in the physical environment. In some embodiments, the VR server 120 may enable the user 110 to interact with any of these virtual objects within the VR environment via the VR user device 140. In some embodiments, while the user 110 is using the VR user device 140 to explore the VR environment, the VR server 120 may also monitor the behavior of the user 110 in the physical environment. In some of these embodiments, the VR server 120 may activate the camera 210 and the sensors 212 to periodically (e.g., every second, every 5 seconds, etc.) obtain images and/or sensor data from the camera 210 and the sensors 212 to monitor the behavior of the user 110 in the physical environment. In some embodiments, the sensors 212 may include one or more of an accelerometer, a gyroscope, a geo-location positioning system component, a temperature sensor, a humidity sensor, a heart rate monitor, etc. In some embodiments, at least some of these sensors 212 may be implemented in wearable devices to be worn in different body parts (e.g., arms, hands, legs, feet, etc.) of the user 110 while using the VR user device 140. The VR server 120 may then use these sensors 212 to monitor a location, an orientation, a body movement, biometric data, a temperature, and a humidity associated with the user 110 while the user is using the VR user device 140.

Furthermore, the VR user device 140 may also include an image recognition module. The image recognition module may use one or more image recognition techniques (e.g., an edge-based detection technique, a scale-invariant feature transform technique, etc.) for detecting object(s) in an image captured by the camera 210. As such, by analyzing images captured by the camera 210 and sensor data obtained from the sensors 212, the VR user device 140 may determine a behavior of the user 110 in the physical environment and an interaction of the user with one or more physical objects in the physical environment while the user is using the VR user device 140.

Referring back to FIG. 3, the process 300 may detect (at step 305) a first interaction of a user with a physical object in the physical environment. In one example, by monitoring images captured by the camera 210 and sensor data captured by the sensors 212, the VR user device 140 may determine that the user 110 has just retrieved a physical payment card (e.g., a credit card, a debit card, a gift card, etc.), such as a physical payment card 150, from a pocket of the user 110. In another example, by monitoring images captured by the camera 210 and sensor data captured by the sensors 212, the VR user device 140 may determine that the user 110 has just retrieved a mobile phone 152 of the user 110 from a pocket. In this example, the system 100 has associated the interaction of retrieving a physical object (such as the physical payment card 150 or the physical computing device 152) from a pocket of the user with the virtual object generating function.

At step 310, the process 300 extracts information related to the physical object with which the user interacts in the physical environment. For example, when it is determined that the user 110 has performed a first interaction with the physical payment card 150 (e.g., retrieving the physical payment card 150 from a pocket), one or more images of the physical payment card 150 may be obtained from the camera 210. The images of the physical payment card 150 may be analyzed to extract information related to a payment account associated with the physical payment card 150. For example, an optical character recognition technique may be used to extract an issuing entity, a serial number, a holder name, an expiration date, and a security code from the images of the physical payment card 150. In this example, the physical payment card 150 is issued by PayPal® (based on a logo on the card 150), has a holder name "Jack Wall," and a serial number "4223 1123 3342 3443."

In the other example where it is determined that the user 110 has performed a first interaction with the physical mobile device 152 (e.g., retrieving the physical mobile device 152 from a pocket), the VR user device 140 may identify the physical mobile device 152 based on its appearance (e.g., from the images obtained by the camera 210) and its distance from the VR user device 140 (e.g., based on a strength of the wireless signals generated by the physical mobile device 152 received from the VR user device 140), and establish a communication channel with the physical mobile device 152. For example, the VR user device 140 may use one of the short-range wireless communication protocols such as Bluetooth® or WiFi to establish a communication channel with the physical mobile device 152. Once the communication channel is established with the physical mobile device 152, the VR user device 140 may begin to retrieve data from the physical mobile device 152. For example, a portion of the data stored on the physical mobile device 152 may be designated by the user 110 as shared data, and in response to receiving a data request from the VR user device 140, the physical mobile device 152 may transfer the shared data to the VR user device 140 via the established communication channel. The shared data may include different types of data such as image data, video data, text data (e.g., a contact list, a document, etc.), and other types of data.

By using the information extracted from the physical object, the process 300 generates (at step 315) a virtual object corresponding to the physical object. In the example where the physical object is a physical payment card, a virtual payment card may be generated using the extracted payment account information. In some embodiments, the virtual payment card may include the information extracted from the physical payment card, such as the issuing entity, the serial number, the holder's name, the expiration date, the security code, etc. In other embodiments, however, instead of including the information extracted from the physical payment card, the virtual payment card may include a different account number for security purposes. For example, once the first interaction with the physical payment card is detected, the VR user device 140 may transmit a signal for generating a new virtual payment card to the service provider server 130 via the VR server 120. The signal transmitted to the service provider server 130 may include an identifier that identifies the user 110 and the information extracted from the physical payment card. The service provider server 130 may use the identifier and/or the information of the physical payment card to identify the user account associated with the user 110 and to verify that the physical payment card is a valid funding source for the user 110. In some embodiments, the service provider server 130 may then generate a separate serial number different from the serial number of the physical payment card for the virtual payment card. The service provider server 130 may then transmit the generated serial number to the VR server 120 to be included in the virtual payment card.

Once the newly generated serial number from the service provider server 130 is received, the VR server 120 may include the new serial number in the virtual payment card. In some of these embodiments, the virtual payment card does not store any information that may identify the serial number and other information related to the physical payment card, such that even if the virtual payment card was misplaced or stolen by other users in the VR environment, those other users would not obtain the information of the physical payment card. Furthermore, the VR server 120 may also generate a graphical representation of the virtual payment card so that users in the VR environment may view and interact with the virtual payment card.

FIG. 4 illustrates a virtual payment card 410 generated by the VR server 120 in response to detecting the first interaction of the user 110 with the physical payment card 150. As shown, the virtual payment card 410 does not include any information (e.g., serial number, security code, expiration date, etc.) that may identify the physical payment card 150. In some embodiments, the virtual payment card may include a name of the user 110 "Jack Wall" and a logo of the issuing entity. In the embodiments where a separate serial number is generated by the service provider server 130 for the virtual payment card 410, the new serial number may appear in the virtual payment card 410 representation.

Furthermore, the representation of the virtual payment card 410 may be viewable in the VR environment by only a set of authorized users. For example, the set of authorized users may be designated by the user 110 (as family and friends of the user 110), such that unauthorized users cannot even see or interact with the virtual payment card 410, which further enhances the security of the payment account of the user 110. The set of authorized users may also be designated by the service provider server 130, such that only users who have registered with the service provider server 130 may view or interact with the virtual payment card 410.

The service provider server 130 may store a link that binds the virtual payment card 410 (based on the generated serial number of the virtual payment card) to the physical payment card 150. For example, when the user uses the virtual payment card 410 to make a payment transaction in the VR environment, the service provider server 130 may process the payment transaction using the payment account associated with the physical payment card 150. There are many benefits from having an identifier (serial number) for the virtual payment card 140 different from the identifier (serial number) of the physical payment card. As discussed above, one benefit of having different identifiers (serial numbers) for the physical payment card and the virtual payment card is enhanced security. Even when the virtual payment card 410 is in the hands of a malicious user in the VR environment, the malicious user would not be able to obtain information of the physical payment card 150. Furthermore, the service provider server 130 may enable the user 110 to associate one or more restrictions on the virtual payment card 410. The restrictions associated with the virtual payment card 410 may be different than restrictions associated with the physical payment card 150. For example, a restriction of limiting the virtual payment card 410 to be used only in the VR environment may be automatically associated with any virtual payment cards, such as the virtual payment card 410. This restriction ensures that even if a malicious user is in possession with the virtual payment card 410, the malicious user may only use it in the VR environment, and not in the physical environment. Since the VR environment is computer generated, it is much easier to monitor transactions initiated in the VR environment. For example, the user 110 may request to the VR server 120 that the user 110 be notified whenever a payment transaction is requested using the virtual payment card 410.

In some embodiments, the virtual payment card 410 may automatically inherit or exhibit the attributes from the physical payment card 150. For example, when the physical payment card 150 is associated with a restriction having a maximum per transaction limit of $500, such a restriction may be automatically associated with the virtual payment card 410. Furthermore, any changes to the attributes of the physical payment card 150 may also be automatically applied to the virtual payment card 410.

In the example where the physical object is a physical computing device 152, a virtual computing device may be generated using the data retrieved from the physical computing device 152. The virtual computing device may include a copy of the data retrieved from the physical computing device 152 such that the user 110 may use and/or perform transactions using the retrieved data in the VR environment. Similar to the virtual payment card 410, a graphical representation may be generated by the VR server 120 for the virtual computing device such that the user 110 and other users may view and/or interact with the virtual computing device. Furthermore, the VR server 120 may, via the VR user device 140, perform synchronization between the physical computing device 152 and its corresponding virtual computing device periodically such that their data is synchronized, for example performing synchronization each time the user 110 uses the VR user device 140. For example, when data is removed from the shared drive on the physical computing device 152, corresponding data would also be removed from the virtual computing device, and when data is added to the shared drive on the physical computing device 152, the data would automatically be transmitted to the VR server 120 via the VR user device 140 and to be included as part of the virtual computing device.

Referring back to FIG. 3, once the virtual object is created, the process 300 enables (at step 320) interactions with the virtual object within the VR environment. In some embodiments, users in the VR environment may interact with these generated virtual objects in a similar manner as their physical counterparts. For example, the user 110 may use the virtual payment card 410 to perform payment transactions within the VR environment. In some embodiments, similar to generating the virtual object, using the virtual object to perform a transaction in the VR environment is triggered by a physical interaction with the corresponding physical object in the physical environment. Different physical interactions with the corresponding physical objects in the physical environment may trigger different types of transactions with the virtual object in the VR environment. For example, a vertical swiping movement with the physical payment card 150 may trigger a payment transaction using the virtual payment card 410.

Figure 5:
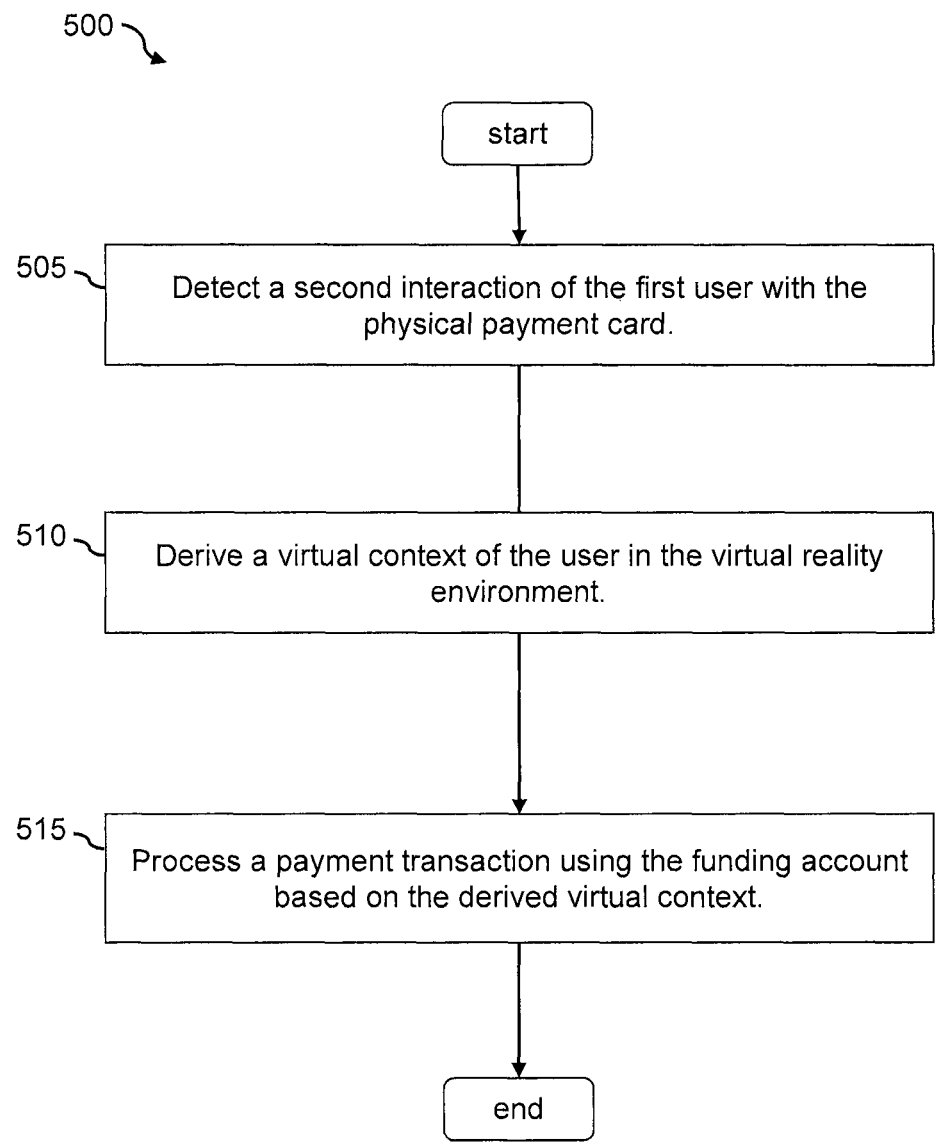
FIG. 5 is a flowchart showing a process of processing a payment using a virtual payment card based on a detected interaction of a user with a corresponding physical payment card according to an embodiment of the present disclosure.

FIG. 5 illustrates a process 500 for initiating a payment transaction using a virtual payment card according to various embodiments of the disclosure. In some embodiments, the process 500 may be performed by the VR system 100. At step 505, a second interaction of the first user with the physical payment card is detected. For example, using the camera 210 and the sensors 212 of the VR user device 140, the VR user device may detect that the user 110 is performing a vertical card swiping gesture (or other predefined card movement, such as an inserting/removing motion or a waving motion) with the physical payment card 150. In response to detecting that the user 110 has performed a vertical card swiping gesture or other specific movement with the physical payment card 150, the process 500 derives (at step 510) a virtual context of the user in the VR environment. For example, the VR server 120 and/or the service provider server 130 may determine a location of the user 110 within the VR environment, any virtual object(s) near the user 110 in the VR environment, a time, and other attributes to derive a virtual context for the user 110.

Figure 6:
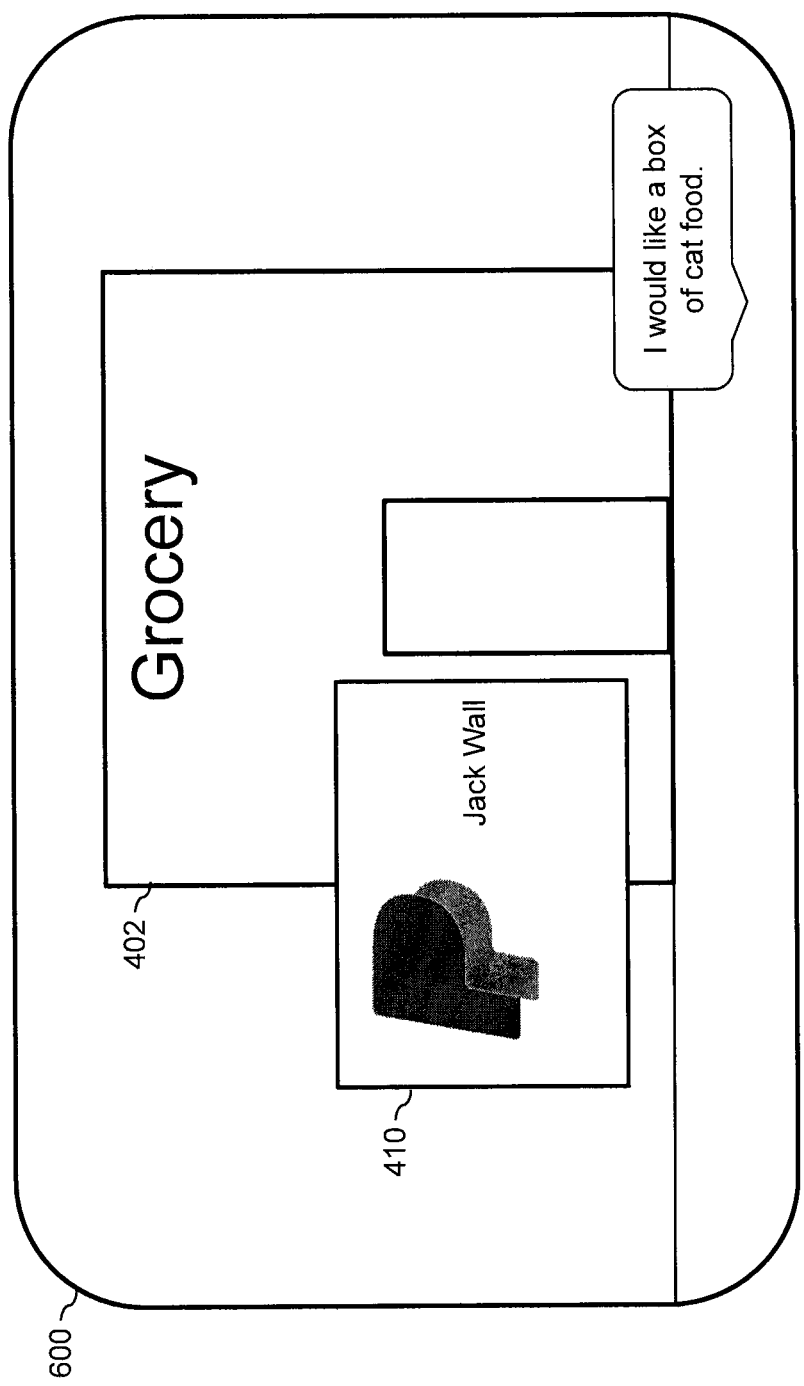
FIG. 6 illustrates another example view of a virtual reality environment according to an embodiment of the present disclosure.

FIG. 6 illustrates a view 600 of the VR environment from the perspective of the user 110 via the VR user device 140. As shown, the user 110 is located at the grocery store 402 and just asked to have a box of cat food, which may be detected through a microphone of the VR user device 140. As such, a virtual context of purchasing a box of cat food from the grocery store 402 may be derived for the user 110. The process 500 may then process (at step 515) a purchase transaction using the funding account associated with the corresponding physical payment card based on the derived virtual context. For example, once the virtual context is derived, the VR server 120 may identify a payee and an amount associated with the purchase transaction based on the derived virtual context. In this example, the payee is the user (e.g., the user 114) associated with the virtual grocery store 402, and the amount is the cost of the box of cat food from the grocery store 402. The VR server 120 may then transmit the information associated with the virtual payment card 410 (the virtual payment card's serial number), the payee, and the amount to the service provider server 130 to process the payment transaction. The service provider server 130 may then identify a funding source based on the serial number of the virtual payment card 410. As discussed above, the service provider server 130 has stored an association between the virtual payment card 410 and the physical payment card 150. Thus, based on the serial number of the virtual payment card 410, the service provider server 130 may identify the corresponding physical payment card 150, and may then use the physical payment card 150 to process the payment transaction.

Figure 8:
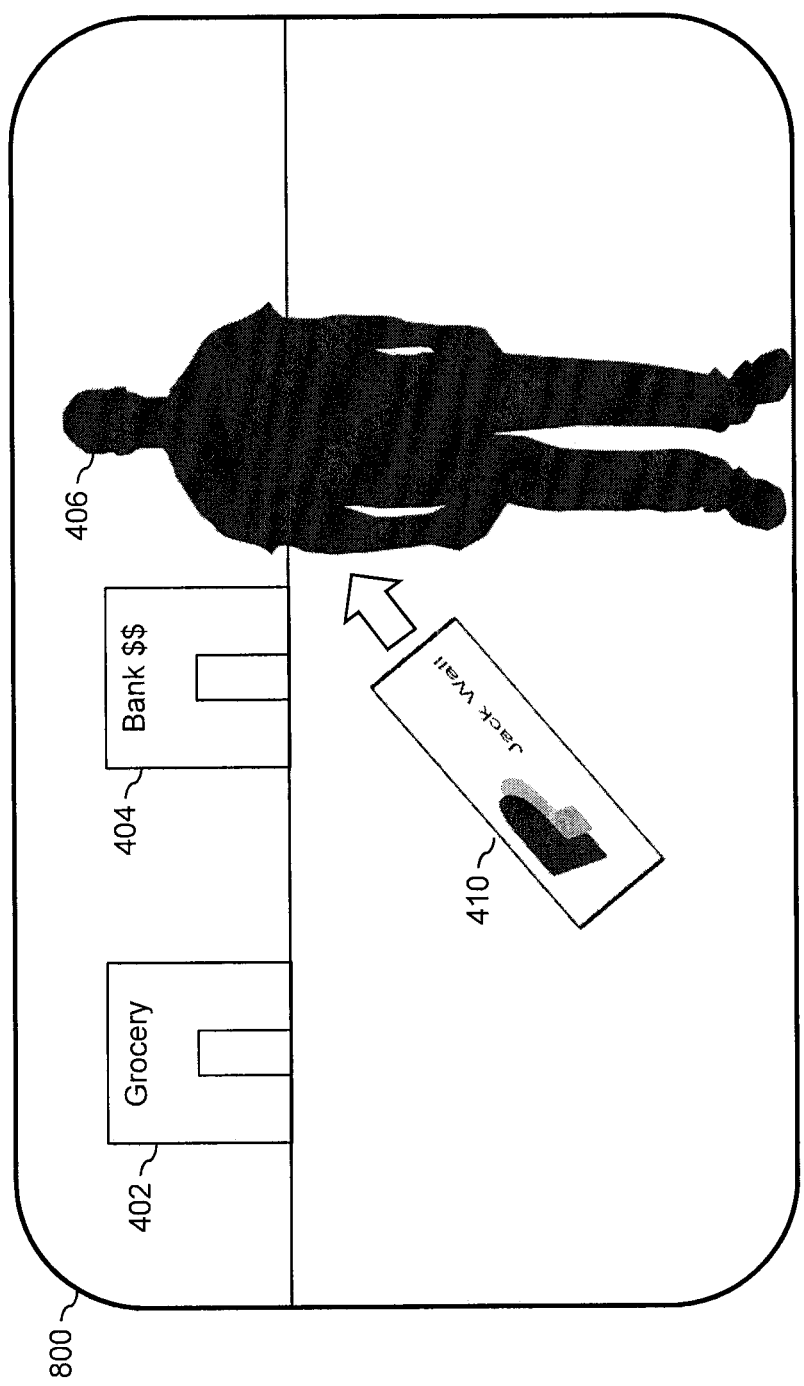
FIG. 8 illustrates another example view of a virtual reality environment showing a virtual payment card being passed to another user according to an embodiment of the present disclosure.

In some embodiments, the VR server 120 may allow the user 110 to pass the generated virtual objects to other users in the VR environment. For example, the user 110 may want to lend the virtual payment card 410 to his son (e.g., the user 112), and thus may pass the virtual payment card 410 to the representation 406 of the user 112. FIG. 8 illustrates a view 800 of the VR environment from the perspective of the user 110 when the user 110 passes the virtual payment card 410 to the representation 406 of the user 112. Although in this example, only a virtual payment card 410 is illustrated to be passed from one user to another user in the VR environment, it has been contemplated that other generated virtual objects, such as the virtual computing device corresponding to the physical computing device 152 or additional payment cards, may also be passed to other users in the VR environment.

Figure 7:
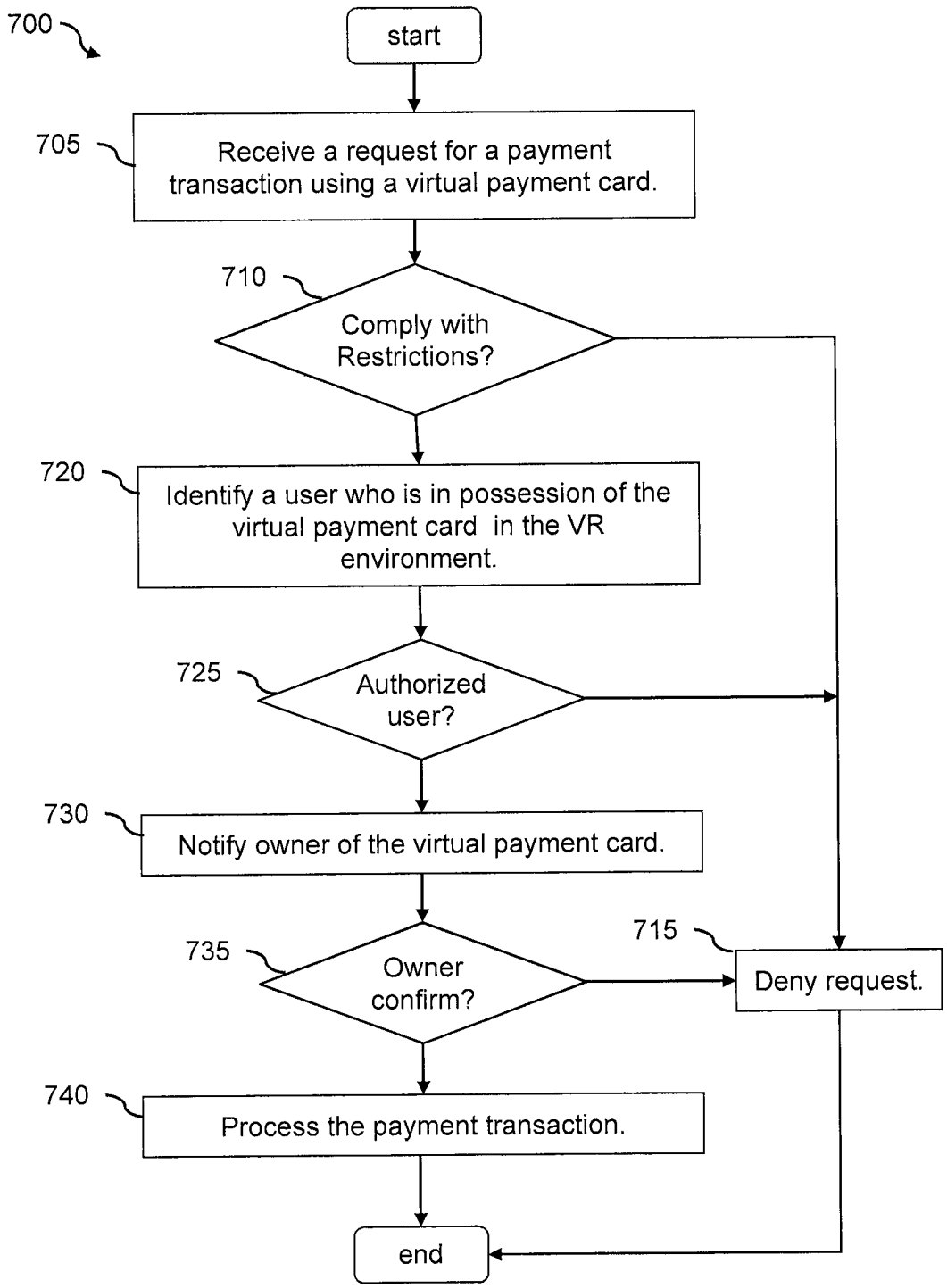
FIG. 7 is a flowchart showing a process of facilitating a payment request initiated by a third party for using a virtual payment card according to an embodiment of the present disclosure.

Once the virtual object is passed to another user in the VR environment, the other user may begin to use the virtual object, for example, to initiate transactions using the virtual objects. FIG. 7 illustrates a process 700 for facilitating a payment transaction in a VR environment using a virtual payment card by a non-owner according to various embodiments of the disclosure. In some embodiments, the process 700 may be performed by the VR system 100. At step 705, the process 700 receives a request for a payment transaction using a virtual payment card. For example, based on monitoring movements of the user 112 using the camera and sensors of the VR user device 142, the VR server 120 may determine that the user 112 has performed a gesture (e.g., a vertical card swiping motion), or providing an input via the input interface 208 of the VR user device 142, that is associated with initiating a payment request. The VR server 120 may then derive a virtual context for the user 112, in a manner similar to step 510 of the process 500 to identify a payee and an amount. For example, based on the derived context, the VR server 120 may determine that the user 112 desires to purchase a game from a virtual store in the VR environment. The VR server 120 then sends a payment request to the service provider server 130. The payment request may include the serial number of the virtual payment card 410, the identity of a user (e.g., the user 114) associated with the virtual store, the identity of a user (e.g., the user 112) who is using the virtual payment card 410, and the amount. Upon receiving the payment request, the service provider server 130 may identify a funding source based on the serial number of the virtual payment card 410. As discussed above, the service provider server 130 has stored an association between the virtual payment card 410 and the physical payment card 150. Thus, based on the serial number of the virtual payment card 410, the service provider server 130 may identify the corresponding physical payment card 150, and any restrictions that are associated with the virtual payment card 410.

Also as discussed above, the virtual payment card 410 may be associated with one or more restrictions, some of which may be automatically associated by the service provider server 130 and some of which may be associated by the user 110. For example, the restriction of limiting transactions in the VR environment may be associated automatically by the service provider server 130. Furthermore, any restrictions (e.g., maximum per transaction limits, etc.) that are associated with the corresponding physical payment card 150 may also be automatically associated with the virtual payment card 410. As such, at step 710, the process 700 determines (at step 710) if all of the restrictions associated with the virtual payment card 410 are satisfied. If it is determined that at least one of the restrictions associated with the virtual payment card 410 is not satisfied, the process 700 denies (at step 715) the payment request. For example, if the payment request for using the virtual payment card 410 is received from a physical merchant store, instead of the VR server 120, which indicates that the virtual payment card 410 is being used outside of the VR environment, the service provider server 130 may deny the payment request.

On the other hand, if it is determined that the payment request satisfies all of the restrictions associated with the virtual payment card 410, the process 700 identifies (at step 720) the person who is using the virtual payment card 410. For example, the service provider server 130 may identify the user 112 who initiates the payment request using the virtual payment card 410 based on the payment request sent from the VR server 120. The process 700 then determines (at step 725) whether the identified person is an authorized user for using the virtual payment card. For example, the service provider server 130 may compare the identity of the user 112 against a list of authorized users for the virtual payment card 410. The list of authorized users may be generated by the user 110 and stored in the accounts database 136 of the service provider server 130. If it is determined that the user 112 is not one of the authorized users for using the virtual payment card 410, the process 700 denies (at step 715) the payment request.

Figure 9:
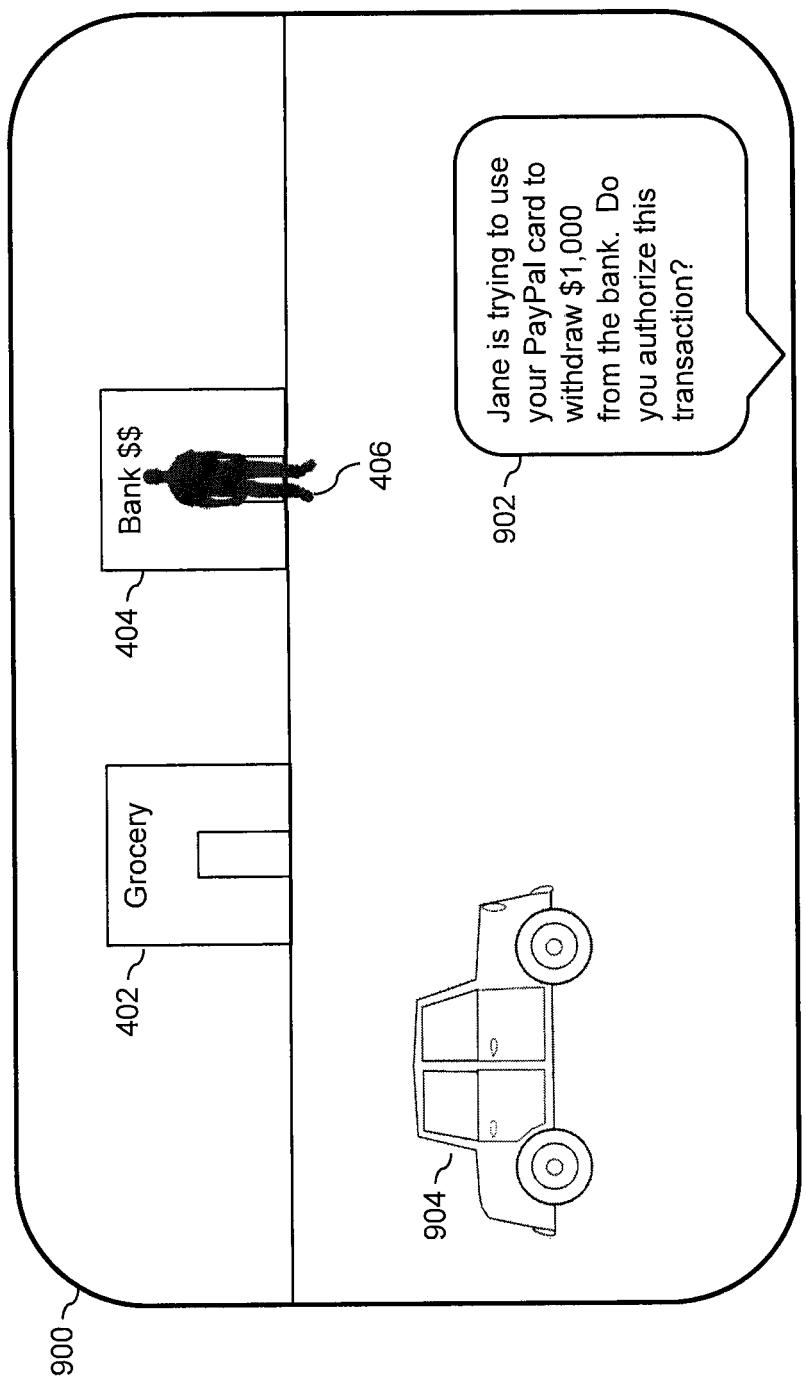
FIG. 9 illustrates another example view of a virtual reality environment showing a notification of a third party payment request according to an embodiment of the present disclosure.

On the other hand, if it is determined that the user 112 is an authorized user for using the virtual payment card 410, the process 700 notifies (at step 730) the owner of the virtual payment card about the payment request. For example, the service provider server 130 may determine that the virtual payment card 410 is associated with (or owned by) the user 110, and thus generates a notification for the user 110. In some embodiments, the service provider server 130 may transmit the notification to the VR server 120, and the VR server 120 may relay the notification to the VR user device 140 to be presented on the display 216 for the user 110. FIG. 9 illustrates a presentation 900 on the display 216 of the VR user device 140 that includes such a notification. The presentation 900 includes a view of the VR environment from the perspective of the user 110, which shows the virtual grocery store 402, the virtual bank 404, the virtual representation 406 of the user 112, and a car 904 in the VR environment. In this example, the user 112 has initiated a payment request at the bank 404 using the virtual payment card 410. Upon determining that the user 112 is an authorized user for using the virtual payment card 410, the service provider server 130 transmits a notification to the VR user device 140 (e.g., via the VR server 120). As shown in the presentation 900, a notification 902 is presented in the presentation 900 on the VR user device 140 of the user 110. The notification notifies the user 110 that the user 112 "John" is attempting to use the virtual payment card 410 to withdraw $1,000 from the virtual bank 404. Instead of, or in addition to presenting a notification on the VR user device 140, the service provider server 130 may send a notification to the user 110 based on contact information (e.g., a phone number, an e-mail address, etc.) of the user 110 stored in the accounts database 136, such that the user 110 may be notified even when the user 110 is not operating the VR user device 140.

In some embodiments, in addition to notifying the user 110, the service provider server 130 may require that the user 110 confirm (or approve) the payment request before processing the payment transaction for the user 112. For example, when the notification is transmitted to the VR user device 140, the user may provide the confirmation or approval via the input interface 208 on the VR user device 140. Thus, the process 700 determines (at step 735) whether the owner of the virtual payment card confirms or approves the transaction. If it is determined that the owner does not confirm, the process 700 denies (at step 715) the request. For example, if the service provider server 130 receives a disapproval response from the user 110, or does not receive a confirmation or approval from the user 110 after a predetermined period of time (e.g., 5 minutes, 10 minutes, etc.), the service provider server 130 may deny the request from the user 112. The service provider server 130 may then transmit a payment denial message to the VR user device 142 (via the VR server 120) to notify the user 112 that the payment request has been denied.

On the other hand, if it is determined that the owner of the virtual payment card has confirmed or approved the transaction, the process 700 processes (at step 740) the payment transaction. For example, the service provider server 130 may use the payment application 130 to process a payment using the funding source associated with the physical payment card 150 to transfer funds to the payee listed in the payment transaction. After the payment transaction is processed, the service provider server 130 may transmit a transaction complete notification to both the VR user device 142 and the VR user device 140 notifying the users 110 and 112 that the transaction is complete.

Although the process 700 describes the example of facilitating a payment transaction using a virtual payment card, a similar process may be implemented for facilitating a transaction using other types of user-generated virtual objects, such as a virtual computing device. In the example of a virtual computing device, when a non-owner of the device requests a transaction using the virtual computing device (e.g., a data transfer transaction), the service provider server 130 may notify the owner of the virtual computing device regarding the transaction request. The service provider server 130 may also request the owner provide a confirmation and approval before processing the data transfer request.

The examples above illustrate passing a virtual object to another user in the VR environment, where the virtual object is generated by the VR user device or other computing device based on user input or action. In some embodiments, instead of passing the virtual object to another user, the VR system 100 may enable another instance of the virtual object, and pass an instance of the virtual object to another user. This way, the owner of the virtual object may generate, through an appropriate computing device, as many instances as he/she likes, and pass the instances to multiple different users in the VR world. In addition, the user may still be in possession of the virtual object while sharing instances of the virtual object with different users in the virtual environment. In the example where the virtual object is the virtual payment card 410, when an additional instance of the virtual payment card 410 is generated, a different serial number may be assigned to the additional instance of the virtual payment card 410, and linked back to the physical payment card 150. Thus, different instances of the virtual payment card 410 may be possessed by different users, and different restrictions may also be associated with the different instances of the virtual payment card 410.

The process 700 illustrates an example implementation of enabling an owner of a user-generated virtual object to exert control over the virtual object when the virtual object is used by a non-owner. In some embodiments, additional techniques may be implemented by the VR system 100 to enable the owner of a user-generated virtual object to exert further controls over the virtual object when the virtual object is possessed by a non-owner. In some embodiments, the VR system 100 may enable the owner of the virtual object to remotely recall the virtual object by performing a predefined interaction with a physical object corresponding to the virtual object in the physical environment. For example, the system 100 may define a particular gesture or interaction with a physical object to associate with the recall function. The particular interaction may be flipping the physical object upside down on a table, putting the physical object away from the view of the camera of the VR user device, drawing a symbol (an 'X' symbol) on top of the physical object, or other types of interaction or gestures. Once defined and associated with the recall function, the owner of the virtual object may remotely recall the virtual object without interacting with the non-owner who has possession of the virtual object in the VR environment.

For example, after the user 110 gives away the virtual payment card 410 to the user 112 in the VR environment, the user 110 may remotely recall the virtual payment card 410 without any interaction with the user 112 in the VR environment. In some embodiments, the VR system 100 may detect that the user 110 has performed the predefined gesture or interaction with the physical payment card 150 (e.g., the user 110 has put the physical payment card 150 back into the pocket), based on image data captured by the camera 210 and sensor data obtained from the sensors 212 of the VR user device 140. In response to detecting that the user 110 has performed the predefined gesture or interaction, the VR system 100 recalls the virtual payment card 410 by relocating the virtual payment card 410 from the non-owner (e.g., the virtual representation 406 of the user 112) to the owner (e.g., the user 110) of the virtual payment card 410.

Figure 10:
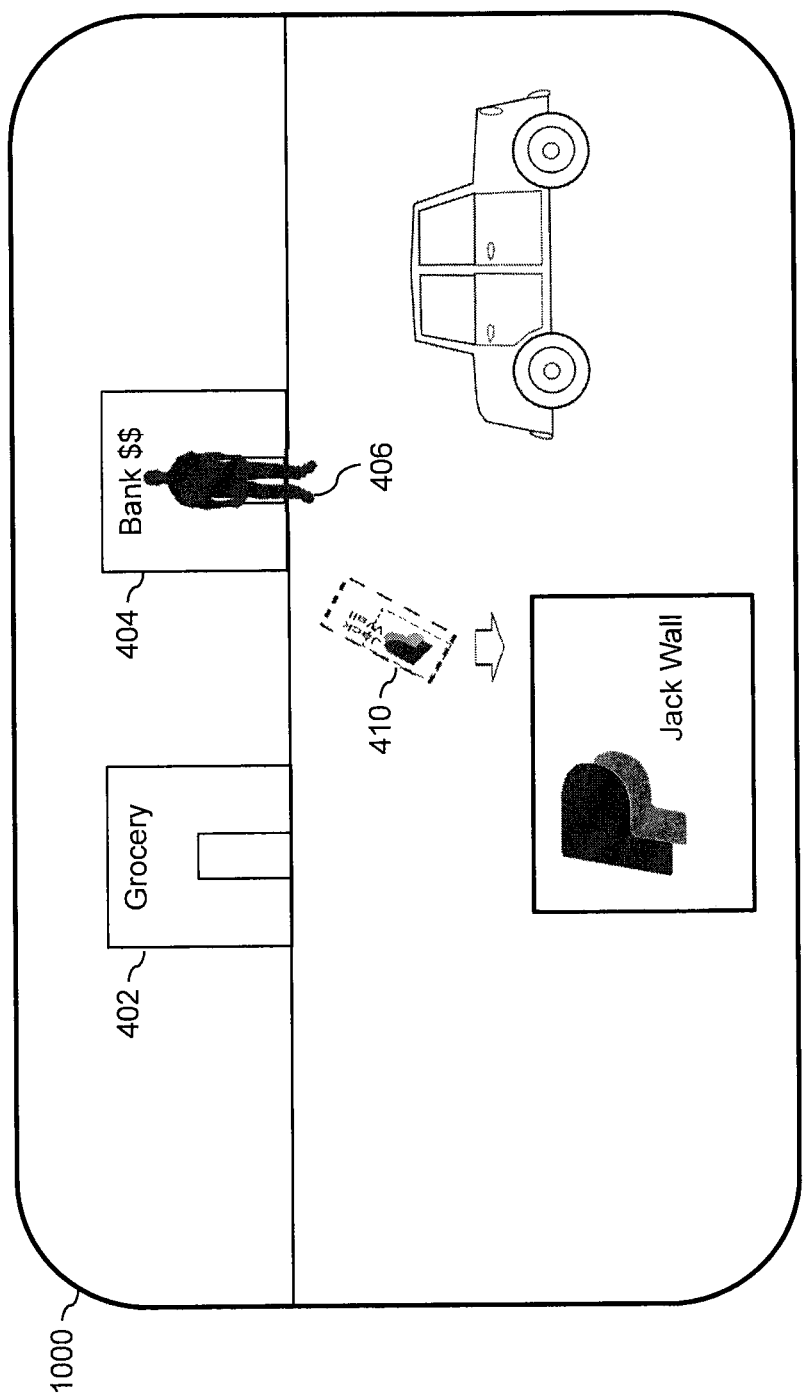
FIG. 10 illustrates another example view of a virtual reality environment showing a recall of a virtual payment card according to an embodiment of the present disclosure.

FIG. 10 illustrates a view 1000 of the VR environment from the perspective of the user 110 when the user 110 recalls the virtual payment card 410. In this example, the user 110 has given the virtual payment card 410 to the user 112. The view 1000 shows that the virtual representation 406 of the user 112 is standing in front of the virtual bank 404 far away from the user 110. At this time, the user 110 may perform a gesture (e.g., making an 'X' sign with a finger) or an interaction with the physical payment card 150 that corresponds to the virtual payment card 410 (e.g., putting the physical payment card 150 away into a pocket of the user 110) that has been associated with a recall feature. Upon determining that the user has performed the gesture or interaction with the physical payment card 150, the VR system 100 may recall the virtual payment card 410 back to the owner, the user 110, as indicated by the virtual payment card 410 moving away from the representation 406 of the user 112 back to the user 110 in the view 1000. With this feature, the user 110 may recall a user generated virtual object, such as the virtual payment card 410, or a virtual computing device corresponding to the physical computing device 152, any time regardless of where the virtual object is located within the VR environment. The recall maybe associated with invalidating or refusing any subsequent transactions requested through the virtual payment card 410, such as for any transaction request or for all transaction requests not initiated through the user 110 (or the physical card owner).

FIG. 10 illustrates the feature of recalling the virtual object. In some embodiments, the owner of the virtual object may wish to suspend all transactions related to the virtual object in the VR environment without recalling the virtual object. As such, the VR system 100 may define another gesture or interaction with the corresponding physical object to be associated with a transaction suspension feature. For example, the gesture or interaction may include flipping the corresponding object upside down. As such, when the VR system 100 determines, based on images captured by the camera and/or sensor data obtained from the sensors of the VR user device, that the user has performed such a predefined gesture or interaction, the VR system 100 may suspend all transactions using the virtual object by any users. For example, when the VR server 120 determines that the user 110 has flipped the physical payment card 150 upside down, based on images captured by the camera 210 and/or sensor data obtained from the sensors 212 of the VR user device 140 or from sensors on the physical payment card 150, the VR server 120 may electronically transmit a transaction suspension request to the service provider server 130. The transaction suspension request may include information related to the virtual payment card 410 (e.g., the serial number of the virtual payment card 410). The service provider server 130 may then identify an account from multiple accounts stored in the accounts database 136 associated with the virtual payment card 410 and put a flag in that identified account to suspend all transactions related to the virtual payment card 410 indefinitely.

The user 110 may then reverse the suspension by performing another gesture or interaction with the physical payment card 150, for example, by flipping back the physical payment card 150 such that the front side of the physical payment card 150 faces up. Similar process may be implemented for other user-generated virtual objects, such as the virtual computing device, as well.

Figure 11:
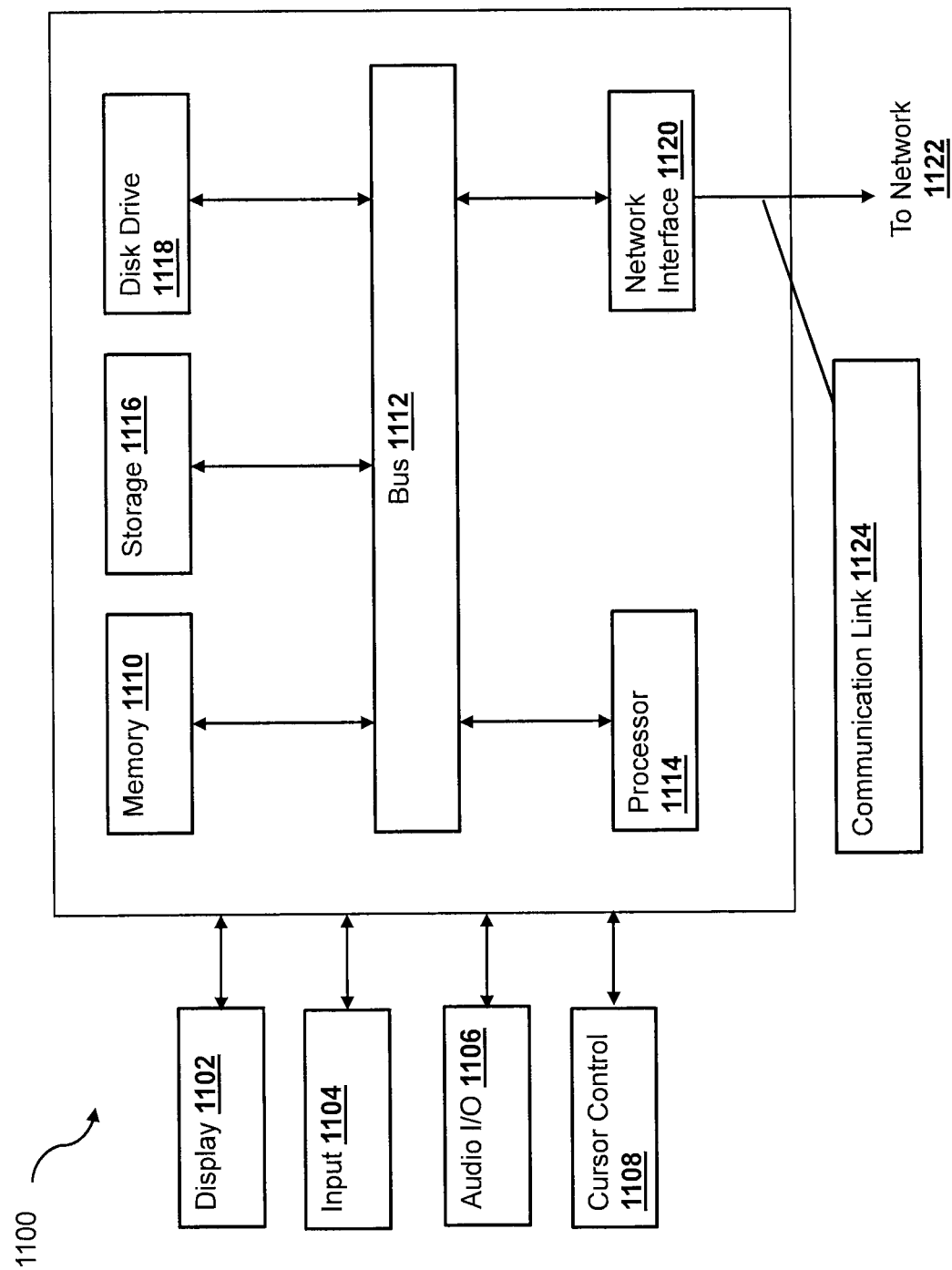
FIG. 11 is a block diagram of a system for implementing a device according to an embodiment of the present disclosure.

FIG. 11 is a block diagram of a computer system 1100 suitable for implementing one or more embodiments of the present disclosure, including the service provider server 130, the VR server 120, the web server 114, the physical computing device 152, and the VR user devices 140, 142, and 144. In various implementations, the physical computing device 152 may include a mobile cellular phone, personal computer (PC), laptop, wearable computing device, etc. adapted for wireless communication, and each of the service provider server 130 and the VR server 120 may include a network computing device, such as a server. Thus, it should be appreciated that the devices 120, 130, 140, 142, 144, and 152 may be implemented as computer system 500 in a manner as follows.

Computer system 1100 includes a bus 1112 or other communication mechanism for communicating information data, signals, and information between various components of computer system 1100. Components include an input/output (I/O) component 1104 that processes a user (i.e., sender, recipient, service provider) action, such as selecting keys from a keypad/keyboard, selecting one or more buttons or links, etc., and sends a corresponding signal to bus 1112. I/O component 1104 may also include an output component, such as a display 1102 and a cursor control 1108 (such as a keyboard, keypad, mouse, etc.). The display 1102 may be configured to present a login page for logging into a user account or a checkout page for purchasing an item from a merchant. An optional audio input/output component 1106 may also be included to allow a user to use voice for inputting information by converting audio signals. Audio I/O component 1106 may allow the user to hear audio. A transceiver or network interface 1120 transmits and receives signals between computer system 1100 and other devices, such as another user device, a merchant server, or a service provider server via network 1122. In one embodiment, the transmission is wireless, although other transmission mediums and methods may also be suitable. A processor 1114, which can be a micro-controller, digital signal processor (DSP), or other processing component, processes these various signals, such as for display on computer system 1100 or transmission to other devices via a communication link 1124. Processor 1114 may also control transmission of information, such as cookies or IP addresses, to other devices.

Components of computer system 1100 also include a system memory component 1110 (e.g., RAM), a static storage component 1116 (e.g., ROM), and/or a disk drive 1118 (e.g., a solid state drive, a hard drive). Computer system 1100 performs specific operations by processor 1114 and other components by executing one or more sequences of instructions contained in system memory component 1110. For example, processor 1114 can perform the virtual objects generation and control functionalities described herein according to the processes 300, 500, and 700.

Logic may be encoded in a computer readable medium, which may refer to any medium that participates in providing instructions to processor 1114 for execution. Such a medium may take many forms, including but not limited to, non-volatile media, volatile media, and transmission media. In various implementations, non-volatile media includes optical or magnetic disks, volatile media includes dynamic memory, such as system memory component 1110, and transmission media includes coaxial cables, copper wire, and fiber optics, including wires that comprise bus 1112. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1100. In various other embodiments of the present disclosure, a plurality of computer systems 1100 coupled by communication link 1124 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method of facilitating a transaction in a virtual reality environment, the method comprising:
providing, by one or more hardware processors, a first user access to the virtual reality environment via a device;
determining, by one or more hardware processors using a camera of the device, that the first user has performed a first predetermined interaction with a physical payment card in a real-world environment;
in response to determining that the first user has performed the first predetermined interaction with the physical payment card in the real-world environment, obtaining, by one or more hardware processors using the camera, an image of the physical payment card;
extracting, by one or more hardware processors, information associated with an account from the image;
generating, by one or more hardware processors, a virtual payment card using the extracted information for a use in the virtual reality environment;
monitoring, using the camera, interactions between the first user and the physical payment card in the real-world environment while the first user is interacting with the virtual reality environment;
detecting a second predetermined interaction of the first user with the physical payment card in the real-world environment based on the monitoring;
determining a context associated with the first user within the virtual reality environment; and
performing a payment transaction in the real-world environment based on the detected second predetermined interaction and the context.

2. The method of claim 1, further comprising:
generating a representation of the virtual payment card; and
presenting the representation of the virtual payment card in the virtual reality environment.

3. The method of claim 2, wherein the information of the account is obfuscated in the representation of the virtual payment card.

4. The method of claim 2, wherein the representation of the virtual payment card is viewable only by a set of users within the virtual reality environment authorized by the first user.

5. The method of claim 1, further comprising:
determining that the virtual payment card is passed to a second user who is authorized by the first user to use the virtual payment card; and
enabling the second user to conduct a transaction using the account by interacting with the virtual payment card in the virtual reality environment.

6. The method of claim 5, further comprising:
determining that the first user has performed a third predetermined interaction with the physical payment card in the real-world environment; and
in response to determining that the first user has performed the third predetermined interaction with the physical payment card, disabling the second user from making the transaction in the virtual reality environment using the account.

7. The method of claim 6, further comprising in response to determining that the first user has performed the third predetermined interaction with the physical payment card, automatically moving the virtual payment card back to the first user.

8. The method of claim 5, further comprising in response to determining that the second user initiates the transaction using the virtual payment card in the virtual reality environment, transmitting a notification to the first user, wherein the notification comprises information related to the transaction.

9. The method of claim 1, wherein the information associated with the account comprises a first card identifier, wherein the generated virtual payment card comprises a second card identifier different from the first card identifier and lacks information related to the first card identifier.

10. The method of claim 9, further comprising:
receiving a request for a second payment transaction comprising the second card identifier;
determining that the second payment transaction is initiated in the virtual reality environment; and
in response to determining that the second payment transaction is initiated in the virtual reality environment, processing the transaction using the account.

11. The method of claim 9, further comprising:
receiving a request for a second payment transaction comprising the second card identifier;
determining that the second payment transaction is initiated outside of the virtual reality environment; and
in response to determining that the second payment transaction is initiated outside of the virtual reality environment, denying the request.

12. A system for facilitating a transaction in a virtual reality environment, the system comprising:
a non-transitory memory; and
one or more hardware processors coupled with the non-transitory memory and configured to read instructions from the non-transitory memory to cause the system to perform operations comprising:
providing a first user access to the virtual reality environment via a device;
determining that the first user has performed a first predetermined interaction with a physical payment card in a real-world environment;
in response to determining that the first user has performed the first predetermined interaction with the physical payment card, obtaining, using an image capturing device, an image of the physical payment card;
extracting information associated with an account from the image;
generating a virtual payment card using the extracted information;
monitoring, using the image capturing device, interactions between the first user and the physical payment card in the real-world environment while the first user is interacting with the virtual reality environment;
detecting a second predetermined interaction of the first user with the physical payment card in the real-world environment based on the monitoring;
determining a context associated with the first user within the virtual reality environment; and
performing a payment transaction in the real-world environment based on the detected second predetermined interaction and the context.

13. The system of claim 12, wherein the operations further comprise:
determining that the first user was interacting with a second user within the virtual reality environment when the second predetermined interaction is detected, wherein the performing the payment transaction comprises transferring funds from the account of the first user to an account of the second user.

14. The system of claim 12, wherein the operations further comprise:
generating a representation of the virtual payment card; and
presenting the representation of the virtual payment card in the virtual reality environment.

15. The system of claim 14, wherein the information of the account is obfuscated in the representation of the virtual payment card.

16. The system of claim 12, wherein the operations further comprise:
determining that the virtual payment card is passed to a third user who is authorized by the first user to use the virtual payment card; and
enabling the third user to use the virtual payment card as part of a transaction by interacting with the virtual payment card in the virtual reality environment.

17. The system of claim 16, wherein the operations further comprise:
determining that the first user has performed a third predetermined interaction with the physical payment card in the real-world environment; and
in response to determining that the first user has performed the third predetermined interaction with the physical payment card, disabling the third user from using the virtual payment card in the virtual reality environment.

18. The system of claim 17, wherein the operations further comprise in response to determining that the first user has performed the third predetermined interaction with the physical payment card, automatically relocating the virtual payment card back to the first user.

19. A non-transitory machine-readable medium having stored thereon machine-readable instructions executable to cause a machine to perform operations comprising:
providing a user access to a virtual reality environment via a device;
determining, using a camera, that the user has performed a first predetermined interaction with a physical payment card in a real-world environment;
in response to determining that the user has performed the first interaction with the physical payment card, obtaining identifying data associated with the physical payment card;
extracting information associated with the physical payment card from the identifying data;
generating a virtual payment card corresponding to the physical payment card using the extracted information;
monitoring, using the camera, interactions between the user and the physical payment card in the real-world environment while the user is interacting with the virtual reality environment;
detecting a second predetermined interaction of the user with the physical payment card in the real-world environment based on the monitoring;
determining a context associated with the user within the virtual reality environment; and
performing a transaction in the real-world environment based on the detected second predetermined interaction and the context.

20. The non-transitory machine-readable medium of claim 19, wherein the operations further comprise:
detecting a third predetermined interaction of the first user with the physical payment card in the real-world environment; and in response to detecting the third predetermined interaction, deactivating the virtual payment card in the virtual reality environment.

* * * * *